Oct. 16, 1956
R. M. SCHIRMER
2,766,583
DETECTION AND PREVENTION OF COMBUSTION
INSTABILITY IN JET ENGINES
Filed March 7, 1952
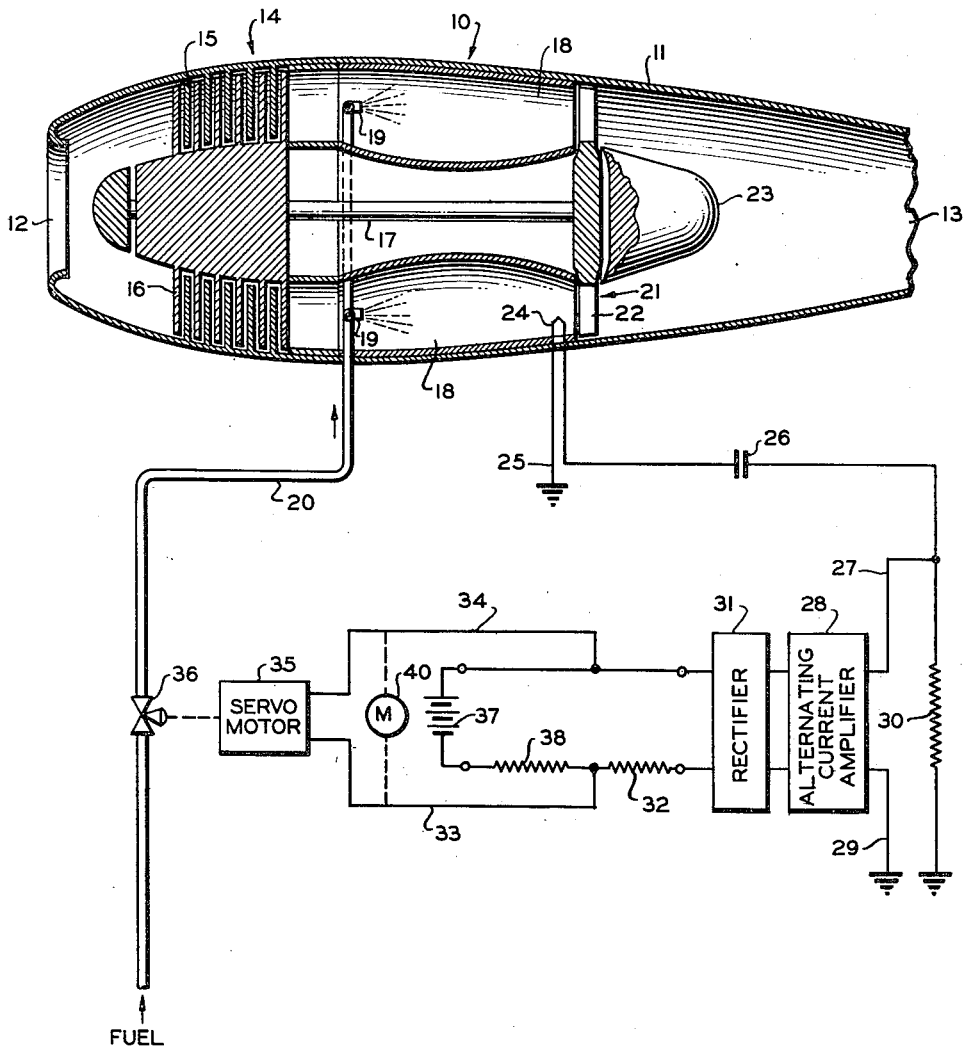
INVENTOR.
R. M. SCHIRMER
BY *Hudson & Young*
ATTORNEYS … # 2,766,583
DETECTION AND PREVENTION OF COMBUSTION INSTABILITY IN JET ENGINES Robert M. Schirmer, Bartlesville, Okla., assignor to Phillips Petroleum Company, a corporation of Delaware Application March 7, 1952, Serial No. 275,316

10 Claims. (Cl. 60—39.28)

This invention relates to apparatus for detection of combustion instability in a jet engine. In another aspect, it relates to apparatus for preventing the occurrence of severe combustion instability in a jet engine, and/or flame impingement upon the turbine blades of a turbojet engine.

It is desirable, in accelerating from a thrust of low level to a thrust of high level, to reach the high thrust level in a short period of time. Control limitations, such as mechanical and hydraulic lags, and the inertia of the compressor-turbine combination in a turbojet cause air flow to lag behind fuel flow during rapid acceleration, with the result that an excessively rich fuel mixture is momentarily obtained. This may cause rich mixture combustion instability, blow-out of the flame, flame impingement upon the turbine blades, or excessive temperature gradients across the combustion chamber.

The usual method to protect the turbine and other parts of the engine from flame impingement employs a thermocouple placed in front of the turbine, the signal from which is effective to reduce the fuel flow whenever a predetermined temperature level is reached. The slow response thermocouples of the prior art were not satisfactory in preventing flame impingement on the turbine blades blades for generally, such flame impingement is periodic and of high frequency. Under such conditions, the slow response thermocouple is an integrating device, and will cause fuel flow reduction only when the integrated temperature is sufficiently high. Thus, flame impingement can occur under certain conditions. If the control system is set to cause fuel reduction at a low integrated temperature, the maximum temperature rise across the combustor is limited, and so maximum thrust is limited.

I have found that the onset of combustion instability is indicated by periodic, high frequency temperature variations, which increase in amplitude as the instability becomes greater. Due to the aforesaid integrating action, the slow response thermocouple is not effective in sensing such high frequency temperature variations, representative of combustion instability.

This invention provides a suitable apparatus for controlling the flow of fuel in a jet engine so as to maintain the fuel-air ratio at such a value that unstable combustion or blow-out is not encountered in rapid acceleration or other maneuvering of the aircraft. A fast-response temperature-sensitive element, such as a fine-wire platinum-platinum rhodium thermocouple, is operatively connected to an over-ride fuel control valve in the fuel system so as to limit the flow of fuel whenever the magnitude of the high frequency temperature fluctuations detected by the fast-responsive temperature-sensitive element become greater than some predetermined value, as unstable combustion is encountered. The control action usually results in the highest possible fuel-air ratio for continuous safe operation of the turbine. Also, I have provided an apparatus for indicating the above-mentioned high frequency temperature fluctuations.

Accordingly, it is an object of the invention to provide apparatus for detection of combustion instability in a jet engine.

It is a further object to provide apparatus for preventing the occurrence of severe combustion instability in a jet engine.

It is a still further object to provide a system which is reliable in operation, economical to operate, and which permits a substantial increase in efficiency in the operation of jet engines.

Various other objects, advantages and features of the invention will become apparent from the following detailed description taken in conjunction with the accompanying drawing, in which the figure is a schematic representation of a jet engine utilizing the control system of the invention.

Referring now to the drawing in detail, I have shown a turbojet engine 10 having a generally cylindrical body 11 provided with an air intake 12 and a compressor 14 including a stator 15 secured to the body 11 and a rotor 16 carried by a shaft 17 suitably journaled in the body 11. Downstream of the compressor 14 are a plurality of combustion chambers 18 spaced in annular formation within the body 11. A fuel nozzle 19 is mounted at the upstream end of each combustion chamber, and all of the nozzles 19 are supplied with fuel by a line 20.

Downstream of the combustion chambers 18 is a turbine 21 having a series of blades 22, the turbine being driven by the hot combustion gases leaving the chambers 18, the resulting rotation of the turbine driving shaft 17 and the rotor 16 of compressor 14. Downstream of the turbine is a discharge air regulating plug 23.

When conditions of combustion instability are approached in the engine, there are relatively rapid fluctuations in the combustion chamber temperature. These fluctuations are superimposed upon a relatively slowly varying temperature level which remains fairly constant under cruising conditions but which rises during periods of acceleration. The rapid fluctuations increase in amplitude as the combustion becomes more unstable and, in many cases, a condition of severe instability will cause the flame to blow out.

Such rapid temperature fluctuations are, in many cases, also indicative of flame impingement on the turbine blades, even when the general temperature level is relatively low.

I have discovered that these rapid fluctuations indicating the onset of combustion instability or flame impingement upon the turbine blades can be measured by a thermocouple having a fast characteristic response time. The ordinary thermocouple does not have a sufficiently fast response time and, accordingly, measures only the integrated effect of the temperature fluctuations previously referred to. That is, the usual thermocouple measures only the general temperature level which is not, in itself, indicative of combustion instability.

In order properly to sense the aforesaid rapid temperature fluctuations, the thermocouple should have a characteristic response time of less than 0.1 second, preferably less than 0.05 second, the characteristic response time being defined as the time in seconds required for the thermocouple to undergo 63 percent of the change in temperature to which it has been instantaneously subjected. A preferred thermocouple is made from 40 gauge wire, or wire of a higher gauge number, one junction being formed from platinum, and the other junction being formed from 10 percent rhodium, and the balance substantially all platinum. The thermocouple junction should be exposed in the combustion chamber, as the usual protective tubes or shields increase the characteristic response time of the thermocouple. Thermocouple junctions formed from other materials can be utilized provided that they have a characteristic response time, as stated, of less than 0.1 second, preferably less than 0.05 second.

In the figure, I have shown such a thermocouple at 24, a location in the downstream portion of the combustion chamber. It will be understood that a plurality of thermocouples to be used in one combustion chamber or a plurality of the chambers can each be provided with one or more thermocouples. This location is advantageous since it permits impingement of the flame upon the turbine blades to be sensed as well as the rapid temperature fluctuations of interest. Flame impingement upon the turbine possibly resulting in engine failure may occur during a period of stable combustion when a high level of thrust is developed by the engine and the volume of the combustion chamber is too small for the flame length required, as well as during periods of unstable combustion. It will be understood that the thermocouple can be placed at other locations in some cases. For example, combustion instability in a combustion chamber, such as an afterburner, may be indicated by high frequency temperature changes of the character described, and picked up by a fast responsive thermocouple suitably located in the afterburner.

Referring again to the figure, it will be noted that one junction of the thermocouple is grounded at 25 and the other junction is connected through a condenser 26 to a lead 27, this lead being connected to one input terminal of an alternating current amplifier 28, the other input terminal being grounded at 29. The amplifier input terminals have an input load resistor 30 connected in parallel therewith. The function of the condenser 26 is to permit the voltage fluctuations resulting from rapid temperature variations to pass to the input circuit of the amplifier 28; such fluctuations being essentially alterating current components. However, the relatively steady component representative of the general temperature level in the combustion chamber is attenuated or eliminated by condenser 26 and does not pass to the amplifier input circuit. Accordingly, parts 26, 30 function as a filter to permit the alternating current components to pass to the amplifier while preventing the passage of direct current, or slowly varying components. It is, of course, within the scope of the invention to use other types of filters between the thermocouple and amplifier to provide a similar result.

The amplified signal from unit 28 is fed to a rectifier 31, which may incorporate a filter, not shown, from which the rectified signal passes through a resistance 32 to two leads 33, 34 which, in turn, are connected to a servomotor 35. The motor 35 regulates a valve 36 in the fuel supply line 20. Direct voltage is applied to the servomotor 35 in opposition to the voltage produced by rectifier 31 by a battery or other direct current source 37 and a resistor 38.

During operation of a jet engine, rapid fluctuations of temperature occur in the combustion chambers 18, these fluctuations having a period of the order of 0.05 second, although in some cases the period may be as long as 0.1 second. That is, the period of the disturbances is roughly equal to the characteristic response time of the thermocouple. During normal operation, these fluctuations are of comparatively small magnitude and, in such case, the rectified voltage produced by unit 31 is insufficient to overcome the voltage of battery 37 so that servomotor 35 maintains valve 36 in a fully open position. Accordingly, fuel is supplied to the combustion chambers at a rate determined by the setting of a manual throttle valve, not shown. When conditions of unstable combustion are approached or when there is flame impingement on the turbine blades, the rapid temperature fluctuations increase in amplitude and, when they are greater than a predetermined magnitude, the rectified voltage produced by unit 31 is sufficient to overcome the voltage produced by battery 37 and cause servomotor 35 to partially close valve 36. As a result, the supply of fuel is decreased and the incipient blow-out of the flame is avoided. In the event that the increase in amplitude of the temperature fluctuations is caused by flame impingement upon the turbine blades 22, the control action of valve 26 decreases the flame length to such an extent that the flame no longer impinges upon the turbine blades.

In some cases, it is not necessary to provide an automatic system. In this event, servomotor 35 can be replaced by a meter 40 connected between the leads 33 and 34.

It will be apparent that I have achieved the objects of my invention in that I have provided a means for detecting combustion instability which, if unchecked, might lead to the blow-out of the flame in a jet engine or damage to the turbine blades. When the automatic control features are utilized, this action is effected automatically so that no blow-out nor damage to the turbine can occur.

While the invention has been described in connection with a present, preferred embodiment thereof, it is to be understood that this description is illustrative only and is not intended to limit the invention.

I claim:

1. A device for determining the presence of combustion instability in a jet engine having a combustion chamber which comprises, in combination, a thermocouple mounted in said combustion chamber, said thermocouple having a characteristic response time of less than 0.1 second, an alternating current amplifier, means for feeding the alternating current component of the output of said thermocouple to said amplifier while filtering out the direct current component, and means for measuring the output of said amplifier.

2. A device for determining the presence of combustion instability in a jet engine having a combustion chamber, and a line for supplying fuel to said combustion chamber which comprises, in combination, a thermocouple mounted in said combustion chamber, said thermocouple having a characteristic response time of 0.05 second or less, an alternating current amplifier, means for feeding the alternating current component of the output of said thermocouple to said amplifier while filtering out the direct current component, and means for measuring the output of said amplifier.

3. A device in accordance with claim 2 where the thermocouple is formed from 40 gauge wire or smaller, one junction of said thermocouple being formed from platinum and the other junction being formed from 10 percent rhodium and the balance substantially all platinum.

4. A device for determining the presence of combustion instability in a jet engine having a combustion chamber, and a line for supplying fuel to said combustion chamber which comprises, in combination, a thermocouple mounted in said combustion chamber, said thermocouple having a characteristic response time of 0.05 second or less, an alternating current amplifier, means for feeding the alternating current component of the output of said thermocouple to said amplifier while filtering out the direct current component, means for measuring the output of said amplifier, means for rectifying the output of said amplifier, a valve in said line for supplying fuel to said combustion chamber, and servomechanism for closing said valve when said rectified output is of greater than a predetermined value.

5. A device in accordance with claim 4 wherein a thermocouple is formed from 40 gauge wire or smaller, one junction of said thermocouple being formed from platinum and the other junction being formed from 10 percent rhodium and the balance substantially all platinum.

6. A device for preventing the occurrence of unstable combustion in a turbojet engine having a compressor, a series of combustion chambers downstream of said compressor, a turbine downstream of said combustion chambers, said turbine being operatively connected to said compressor, and a line for supplying fuel to said combustion chamber which comprises, in combination, a thermocouple mounted in said combustion chamber, said thermocouple having a characteristic response time of less than 0.1 second, an alternating current amplifier, means for feeding the alternating current component of the output of said thermocouple to said amplifier while filtering out the direct current component, and means for measuring the output of said amplifier.

7. A device for determining the presence of combustion instability in a jet engine having a combustion chamber which comprises, in combination, a thermocouple mounted in said combustion chamber, said thermocouple having a characteristic response time of less than 0.1 second, an alternating current amplifier, means for feeding the alternating current component of the output of said thermocouple to said amplifier while filtering out the direct current component, and means responsive to the output of said amplifier.

8. A device for preventing the occurrence of unstable combustion in a turbojet engine having a compressor, a series of combustion chambers downstream of said compressor, a turbine downstream of said combustion chambers, said turbine being operatively connected to said compressor, and a line for supplying fuel to said combustion chamber which comprises, in combination, a thermocouple mounted in said combustion chamber, said thermocouple having a characteristic response time of less than 0.1 second, an alternating current amplifier, means for feeding the alternating current component of the output of said thermocouple to said amplifier while filtering out the direct current component, and means responsive to the output of said amplifier.

9. A device for determining the presence of combustion instability in a jet engine having a combustion chamber which comprises, in combination, a temperature-responsive element mounted in said combustion chamber, said element producing an electrical output representative of the temperature in said combustion chamber which has an alternating current component representative of relatively rapid fluctuations in combustion chamber temperature and a direct current component representative of the general temperature level in said combustion chamber, and said element having a characteristic response time of less than 0.1 second, means connected to said element to filter out the direct current component of said electrical output while preserving the alternating current component thereof, and means for measuring the output of said last-mentioned means.

10. A device for preventing the occurrence of unstable combustion in a jet engine having a combustion chamber, and a line for supplying fuel to said combustion chamber which comprises, in combination, a temperature-responsive element mounted in said combustion chamber to produce an electrical output representative of the temperature in said chamber which has an alternating current component representative of relatively rapid fluctuations in combustion chamber temperature and a direct current component representative of the general temperature level in said combustion chamber, said element having a characteristic response time of less than 0.1 second, an alternating current amplifier, means for feeding the alternating current component of the output of said element to said amplifier while filtering out the direct current component, means for rectifying the output of said amplifier, a valve in said line for supplying fuel to said combustion chamber, and servomechanism connected to said rectifying means to close said valve when the rectified output is of greater than a predetermined value.

References Cited in the file of this patent

UNITED STATES PATENTS

| | | |
|---|---|---|
| 2,335,707 | Streicher | Nov. 30, 1943 |
| 2,336,232 | Doran | Dec. 7, 1943 |
| 2,538,642 | Gardiner et al. | Jan. 16, 1951 |
| 2,553,060 | Miner | May 15, 1951 |
| 2,579,271 | Doyle | Dec. 1, 1951 |
| 2,581,522 | Donna | Jan. 8, 1952 |
| 2,588,998 | Troy et al. | Mar. 11, 1952 |
| 2,591,358 | Imler | Apr. 1, 1952 |
| 2,614,621 | Main | Oct. 21, 1952 |